United States Patent [19]

Anderson et al.

[11] Patent Number: 5,053,234
[45] Date of Patent: Oct. 1, 1991

[54] METHOD FOR PRODUCING A PROTEINACEOUS PRODUCT BY DIGESTION OF RAW ANIMAL PARTS

[75] Inventors: Paul S. Anderson, Astoria; Roger W. Law, Tualatin; Ronald R. Law; Kenneth Lum, both of Astoria, all of Oreg.

[73] Assignee: Advanced Hydrolyzing Systems, Inc., Astoria, Oreg.

[21] Appl. No.: 535,500

[22] Filed: Jun. 8, 1990

Related U.S. Application Data

[63] Continuation-in-part of Ser. No. 398,326, Aug. 13, 1989, abandoned, which is a continuation of Ser. No. 262,140, Oct. 21, 1988, abandoned, which is a continuation of Ser. No. 148,092, Jan. 26, 1988, abandoned, which is a continuation of Ser. No. 18,848, Feb. 24, 1987, abandoned, which is a continuation of Ser. No. 605,120, Apr. 30, 1984, abandoned.

[51] Int. Cl.$^5$ .......................... A23L 1/31; A23J 1/02; A23J 3/00; C07K 3/02

[52] U.S. Cl. .......................... 426/59; 426/56; 426/657; 435/68.1; 435/268; 435/272; 435/287; 435/819

[58] Field of Search .................. 426/55, 56, 59, 657; 435/268, 272, 287, 819, 68.1

[56] References Cited

U.S. PATENT DOCUMENTS

| | | | |
|---|---|---|---|
| 2,350,811 | 6/1944 | Percheron | 99/14 |
| 2,651,647 | 9/1953 | Greenfield | 260/412.1 |
| 3,041,174 | 6/1962 | Ehlert | 99/7 |
| 3,071,468 | 1/1963 | Docken | 99/7 |
| 3,170,794 | 2/1965 | Jeffreys et al. | 99/18 |
| 3,249,442 | 5/1966 | Keyes et al. | 99/18 |
| 3,547,652 | 12/1970 | Jeffreys | 99/18 |
| 3,561,973 | 2/1971 | Rutman | 99/18 |
| 3,674,640 | 7/1972 | Takeda et al. | 435/819 X |
| 3,692,538 | 9/1972 | Moss et al. | 99/107 |
| 3,796,811 | 3/1974 | Huth et al. | 426/59 |
| 3,928,630 | 12/1975 | Perini | 426/7 |
| 3,970,520 | 7/1976 | Feldman et al. | 195/29 |
| 4,176,199 | 11/1979 | Vollmer et al. | 426/59 |
| 4,185,121 | 1/1980 | Huster et al. | 426/250 |
| 4,237,003 | 12/1980 | El-Szyed | 435/819 X |
| 4,293,571 | 10/1981 | Olofsson et al. | 426/7 |
| 4,293,583 | 10/1981 | Farr et al. | 426/657 |
| 4,361,586 | 11/1982 | Meinke | 426/7 |
| 4,389,423 | 6/1983 | Madsen | 426/417 |
| 4,405,649 | 9/1983 | Jeffreys et al. | 426/56 X |
| 4,443,540 | 4/1984 | Chervan et al. | 435/69 |
| 4,526,791 | 7/1985 | Young | 426/53 |

FOREIGN PATENT DOCUMENTS

890866 1/1972 Canada.
441915 12/1974 U.S.S.R..

*Primary Examiner*—David M. Naff
*Attorney, Agent, or Firm*—Klarquist, Sparkman, Campbell, Leigh & Whinston

[57] ABSTRACT

A particulate proteinaceous product is prepared from waste raw protein-containing animal parts with a method and an apparatus having a mulling stage wherein the raw animal parts are reduced to a ground condition; a hydrolyzing stage wherein proteins in the ground animal parts are hydrolyzed to a predetermined extent to form an aqueous suspension, using either endogenous or supplementary proteolytic enzymes, and subsequently heated to inactivate the enzymes and convert fats in the suspension to oils; a screening stage wherein non-digestible solids are removed from the suspension; a concentration stage wherein extraneous oil is added to the suspension, the suspension is pasteurized, and a large portion of the water is removed therefrom; and an oil-separation stage wherein sufficient oil is removed to form the product. A portion of the removed oil is routed back to the beginning of the concentration stage as extraneous oil added to the suspension to permit sufficient water to be removed from the suspension without forming a stiff, unprocessable mass. The method is distinctive in that it produces a dry, flaky product without the use of a conventional dryer. The method is also distinctive for its substantial resistance to equipment clogging. The proteinaceous product is dry to the touch, is compressible into pellets or cakes, and contains about 45 to 65 w/w percent partially hydrolyzed, non-denatured animal protein, about 20 to 35 w/w percent oil derived from the animal parts, about 10 to 15 w/w percent moisture, and about 0 to 7 w/w percent ash. The product also has reduced objectionable odor, reduced propensity to oxidize, and high nutritional value.

33 Claims, 2 Drawing Sheets

METHOD FOR PRODUCING A PROTEINACEOUS PRODUCT BY DIGESTION OF RAW ANIMAL PARTS

CROSS REFERENCE TO RELATED APPLICATIONS

This application is a Continuation-In-Part of U.S. Pat. application Ser. No. 07/398,326, filed on Aug. 23, 1989, non abandoned, which is a continuation of U.S. Pat. application Ser. No. 07/262,140, filed on Oct. 21, 1988, now abandoned, which is a continuation of U.S. Pat. application Ser. No. 07/148,092, filed on Jan. 26, 1988, now abandoned, which is a continuation of U.S. Pat. application Ser. No. 07/018,848, filed on Feb. 24, 1987, now abandoned, which is a continuation of U.S. Pat. application Ser. No. 06/605,120, filed on Apr. 30, 1984, now abandoned.

BACKGROUND OF THE INVENTION

1. Field of the Invention

This invention relates to a process for the digestion of animal by-products and the subsequent production of a concentrated protein product therefrom.

2. General Discussion of the Prior Art

Animals intended to be processed into food contain large amounts of protein, not all of which is often utilized. For example, in the production of fish fillets, a substantial amount of waste is left after removing the fillets from the fish. This waste is in the form of "fillet frames" comprising the head and tail, backbone, skin and fins, entrails, and leftover flesh not removed in the fillet. Also, large-scale fishing operations result in the capture of large numbers of "trash" fish which represent a valuable source of animal protein that is often wastefully discarded. Abattoir processing of poultry and large terrestrial animals for use as food yields a certain amount of waste material and by-products containing protein that would be beneficial to recover. Terrestrial animals include ovines (sheep), porcines (hogs), and bovines (cattle). Although fillets and conventional cuts of meat represent a more desirable form of animal protein for human consumption, the protein residing in "waste" parts also represents a valuable food source, particularly as animal food or food supplements.

In the interest of food production to either directly or indirectly support an expanding world population, it is economically and environmentally desirable to recover waste protein. Major uses for such protein include livestock feed and feed supplements, aquaculture feed, food flavor enhancers, and protein supplements for use in human food.

Many attempts have been made to recover protein from waste animal parts and by-products. For example, U.S. Pat. Nos. 4,361,586 to Meinke; 4,293,571 to Olofsson et al.; 4,176,199 to Vollmer et al.; 3,970,520 to Feldman et al.; 3,928,630 to Perini; 3,796,811 to Huth et al; and Russian Patent No. 441,915 disclose methods by which animal by-products are enzymatically digested (hydrolyzed) to produce concentrated protein products. However, the methods disclosed in these patents have particular disadvantages. Many require long reaction times and are not adaptable to large-scale operations. For example, the methods of U.S. Pat. Nos. 4,361,568 and 3,928,630 require up to 24 hours for hydrolysis. The method of U.S. Pat. No. 4,176,199 requires four to six hours for digestion. In addition, the above-cited methods do not address how to monitor and control the troublesome problem of clogging of the processing machinery, other than by processing only relatively dilute suspensions of proteinaceous material. Such dilute suspensions require large amounts of energy to dehydrate after enzymatic digestion, which adds appreciable cost.

With the high cost of fuel and the need to conserve our natural resources, it is extremely important, especially in large-scale methods for processing animal by-products, that energy consumption be kept to a minimum. As large amounts of energy are required to remove water from high-moisture products, this need is in direct conflict with the need to keep high-protein products from spoiling by drying them to a point where bacteria and molds will no longer grow.

All of the above-cited methods that yield a dry product do so by utilizing conventional dryers which use heated air as a drying medium and are therefore relatively energy inefficient. For example, a spray dryer typical in the art requires 1600 to 1800 BTU's to remove a pound of water as compared to the 500 to 600 BTU's required for a double-effect evaporator to remove a pound of water. Some processes utilize evaporators to remove part of the moisture in the hydrolyzed protein but still must depend on the less efficient conventional dryers to bring the product to its desired dryness. This is because hydrolyzed protein can become very sticky and gummy and difficult to handle during an evaporation process.

Another problem with conventional drying methods is that they are a major source of environmental off-odors associated with conventional protein meal processes. Along with the release of moisture from a dryer, many compounds that cause objectionable odors, such as amine compounds, as well as particulate matter are also released into the atmosphere from conventional drying methods.

The odor problem is further complicated by the fact that many of these odoriferous compounds will react with the oxygen and nitrogen in the heated air and produce even more objectionable products.

Still another drawback to use of conventional dryers is that they are very large and expensive.

It is also important, particularly in large-scale, continuous methods for processing animal by-products, that the method be resistant to clogging of equipment. Clogging is a common problem because protein suspensions exposed to excessive heat and turbulence can undergo appreciable denaturation (analogous to cooking an egg) unless preventative measures and proper equipment design are employed. Even in the absence of denaturation, fat solids are commonly implicated in clog formation because the protein-digesting (proteolytic or protein-hydrolyzing) enzymes do not attack fats. Grinding the raw animal parts as a preliminary step to digestion yields no assurance that clogging will not occur in part because the ground material can easily reagglomerate. Clogging not only forces a shut-down of the processing machinery, but also results in significant waste of the proteinaceous material that must be removed from the equipment in order to restore operation. Further, equipment down-time as a result of clogging results in significant economic inefficiency which can make certain processes economically unfeasible. Further, an unanticipated clog can seriously erode one of the expected benefits of a continuous process; namely, the expectation that the process be able to run for significant periods of time without human intervention.

Many relevant processes known in the prior art include a similar series of steps. These include some form of grinding step; a digestion step wherein the animal protein is mixed with either endogenous or exogenous proteolytic enzymes to digest the raw animal protein; a step in which non-digestible solids are removed, such as bones, scales, and cartilage; and a drying step wherein at least a portion of the residual water in the digested material is removed. The steps during which clogging is most likely to occur are the removal of non-digestible solids and the drying step. However, clogging may occur virtually anywhere in the machinery. Clogs and agglomerates can be extremely difficult to remove and can cause equipment shut-down in a remarkably short period of time.

Clogging is often a problem with existing processes for other reasons. For example, such processes often include a step in which the protein suspension is partially cooked or strongly agitated either before or during enzyme digestion which causes appreciable protein denaturation. Also, other processes that utilize dilute suspensions in an effort to reduce clogging aim to remove the large amounts of water from the material after digestion by various drying steps wherein the resulting protein product becomes very stiff and difficult to pass through downstream machinery afterward.

Another disadvantage of certain existing processes is that they must be performed in batches wherein a given quantity of animal by-products after grinding is placed in a vat or the like containing enzymes, where the mixture is stirred for a given period of time before removal of non-digestible solids and drying of the product. Such batch processes are inherently inefficient, are slower than continuous processes, and are consequently less economical than continuous processes.

Hence, there is a need for a method for producing a non-denatured, partially hydrolyzed protein product by a continuous process that is resistant to clogging.

Further, there is a need for such a process whereby the protein product produced thereby is in a particulate form for ease and longevity of storage.

Further, there is a need for such a process that yields a protein product wherein the degree of protein hydrolysis has been carefully controlled, resulting in a higher-quality protein for food use.

Further, there is a need for such a method yielding a product that can be left either in particulate form or compressed into pellets or blocks as needs or conditions dictate.

Further, there is a need for such a process yielding a product containing sufficient oil for desirable flavor characteristics and consistency without having an objectionable odor.

Further, there is a need for a protein product which contains high-quality oil for caloric value.

Further, there is a need for such a process yielding a protein product from which most of the residual water has been removed to enhance long term storability of the product without spoilage.

Further, there is a need for a process which economically removes most of the residual water from the protein product, even in large-scale operations.

Further, there is a need for a process which removes most of the residual water from the protein product without fouling the air with unpleasant odors and other undesirable compounds.

SUMMARY OF THE INVENTION

The aforementioned needs are met by the present method for producing a non-denatured, partially hydrolyzed proteinaceous product from animal by-products. In a preferred embodiment as shown and described herein, the process comprises five basic stages: a mulling stage, a protein hydrolysis stage, a screening stage, a concentration stage, and an oil-separation stage. These stages enable raw protein-comprising animal parts left over from meat and fish processing operations to be converted into a particulate, protein-rich product usable as a food or food supplement for other animals such as pets, poultry, livestock, and aquaculture-raised fish.

The product is in a particulate flaky form, dry to the touch, and compressible into cakes or pellets. In addition to being rich in protein, the product comprises a substantial amount of high-quality oil also derived from the animal by-products. The product also has less ash, less odor, and more appealing taste to animals than products made according to prior-art processes. The original protein molecules comprising the animal by-products are partially hydrolyzed by the present method to a more controlled degree than with prior-art methods. Further, the protein in the product is non-denatured. As a result, the product is highly nutritious as a protein source. Finally, the product is more resistant to oxidation and molding than prior-art methods.

In the mulling stage, raw animal parts and by-products are converted to a ground condition preferably using a grinder or analogous device. Generally, the resulting ground suspension comprises sufficient water that dilution is not necessary, even to prevent clogging, in contrast to prior-art methods.

In the subsequent protein-hydrolyzing stage, the ground suspension is partially digested (hydrolyzed) using proteolytic enzymes to form an aqueous suspension of partially hydrolyzed animal parts. Digestion is performed at a temperature within a range conducive for hydrolytic activity of the enzymes but without denaturing the protein. The digestive enzymes can be enzymes indigenous to the ground suspension or enzymes added as a supplement such as papain or similar proteolytic enzymes. The conducive temperature is attained preferably using a heat exchanger or analogous device to warm the ground suspension and form a pre-digestion mixture. Protein hydrolysis is preferably conducted by passing the predigestion mixture at a controlled flowrate through a plurality of series-coupled digesters which maintain the conducive temperature and agitate the mixture during passage thereof without denaturing the protein in the mixture. Due in part to the controlled flowrate through the digesters, under "plug-flow" conditions, enzymatic hydrolysis of the protein can be carefully controlled to a predetermined degree unknown in the prior art. Also, use of multiple digesters and "plug-flow" passage of the mixture therethrough permit faster digestion than prior-art methods.

In the subsequent screening stage, the aqueous suspension is further heated and non-digestible solids are separated therefrom. Heating is the preferred way to stop further hydrolysis of protein by deactivating the enzymes in the aqueous suspension. Preferably, the enzymes are heated to about 175° to 200° F. Such heating surprisingly does not cause denaturation of the partially hydrolyzed proteins. Such heating also has the unexpected benefit of making the suspension much less prone to clog formation than in prior-art methods, due to the rendering thereby of fatty solids in the suspension to oils which do not form clogs. After heating the aqueous suspension, non-digestible solids are removed therefrom preferably by passage of the suspension through an inclined vibrating screen or analogous separating device.

In the subsequent concentration stage, oil is added at a controlled flowrate to the aqueous suspension to form a protein-oil suspension which can be subjected to water removal steps without forming an agglomerated mass that is impossible to pump. Afterward, the suspension is pasteurized and most of the water removed therefrom to form an oleaginous suspension of partially hydrolyzed protein. Preferably, pasteurization and a portion of the water removal are performed by passing the protein-oil suspension at a controlled flowrate through a first evaporator which heats the suspension to about 200° to 250° F. at 0 to 15 psig for about 10 to 20 seconds. Then, the suspension is preferably passed at a controlled flowrate through a second evaporator at subatmospheric pressure which completes the desired degree of water removal.

In the subsequent oil-removal stage, extraneous oil is removed from the oleaginous suspension to form the particulate, proteinaceous product comprising about 20 to 35 w/w percent oil, a moisture content about 10 to 15 w/w percent, about 0 to 7 w/w percent ash, and the remainder partially hydrolyzed non-denatured animal protein. Preferably, the oil is removed by passing the oleaginous suspension through a centrifuge or analogous device. A portion of the removed oil is used for adding to the aqueous suspension in the concentration stage.

DETAILED DESCRIPTION

Figure 1:
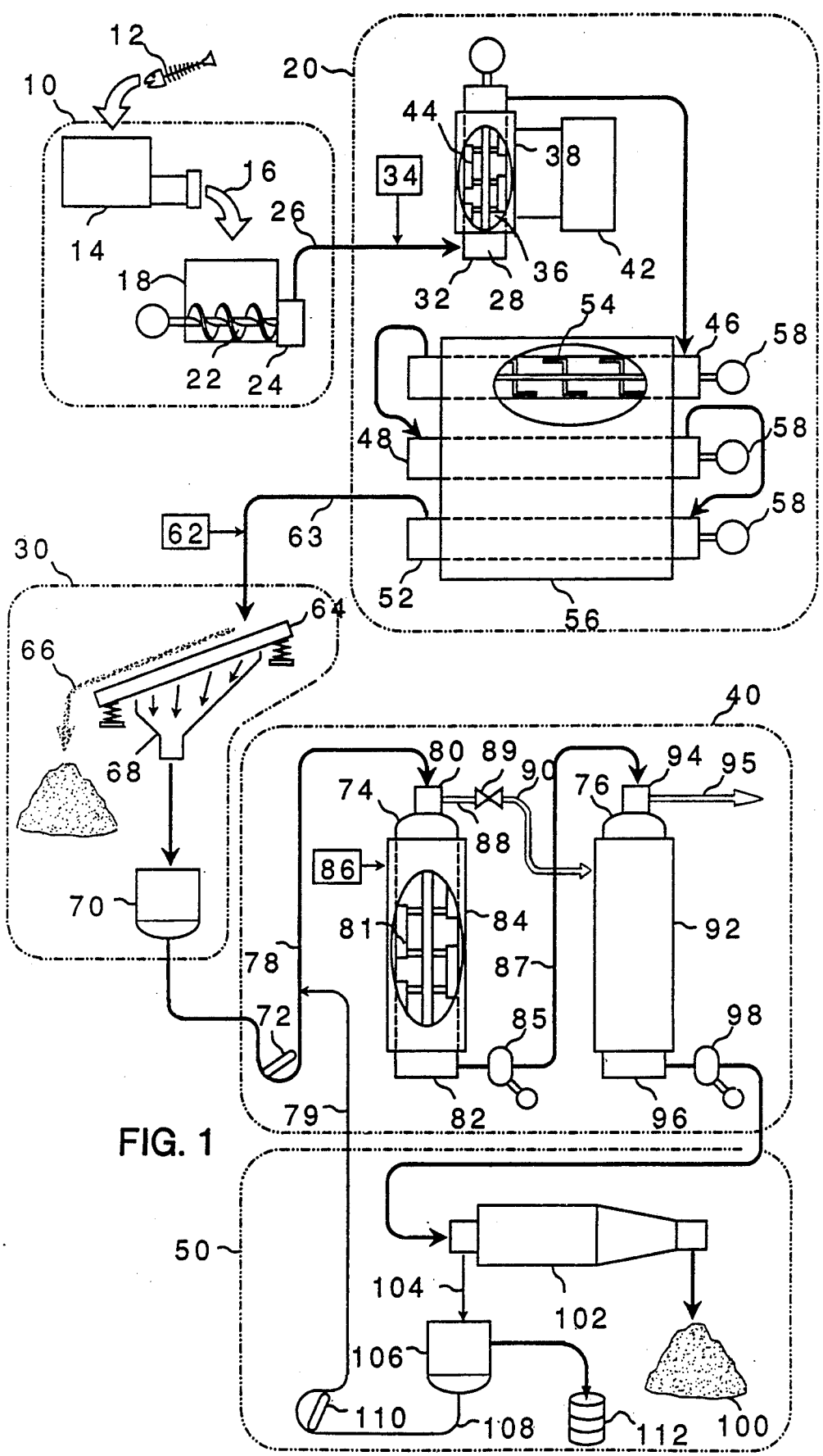
FIG. 1 is a schematic flow diagram of a preferred embodiment of the method.

A process in accordance with the present invention is shown schematically in FIG. 1. Such process is comprised of multiple distinct stages, each of which is comprised of one or more discrete steps. The stages are, in order of occurrence, a mulling stage 10, a protein hydrolysis stage 20, a screening stage 30, a concentration stage 40, and an oil-separation stage 50. These five stages collectively convert raw animal parts 12, such as "fillet frames," as shown, into a particulate, partially hydrolyzed, non-denatured proteinaceous product 100. As used herein, "raw animal parts" denotes any items from a group comprising abattoir remains, other waste animal parts, fillet frames, trash fish, spawned-out fish, animal by-products, usable entrails, and the like.

Typically, the product 100 has a somewhat dry, powdery or flaky consistency. It is readily compressible into pellets or cakes if desired (not shown). For example, one desired form is pellets having a diameter of about ⅛ to ¼ inch. Such pellets are easy to convey via, for example, pneumatic systems. The product 100 may also be pressed into cake or block forms (not shown), each typically weighing about 10 kg, which are also easy to transport.

An important reason for converting the product 100 into a pellet or cake form is to reduce the surface area of the product available for oxidation. Oxidation is a common phenomenon with finely-ground proteinaceous products such as fish meal, generally caused by prolonged and extensive exposure to oxygen in the atmosphere. Oxygen can react with certain fats and oils in such products and cause the oils and fats to chemically change, liberating heat and undesirable odors. In fact, spontaneous combustion can occur with, for example, fish meals if the mass of the product is large enough to entrap and accumulate heat and if exposure to air is not restricted.

Although the product 100 is dry to the touch, it has a relatively high concentration of oil derived ultimately from the raw animal parts 12, in contrast with prior-art products. Such oil not only facilitates compressing the product into pellets or cakes but also confers other benefits. First, since the product 100 is intended to be used as a food or food supplement, the oil tends to make the product more flavorful to animals to which the product is presented for consumption. For example, if the product 100 derived from fish is used in the manufacture of pet foods, the endogenous oil greatly enhances its taste appeal to pets such as cats. Second, the oil is a "high quality" oil which means that it is readily digestible and nutritious. For example, it has been shown that a high oil content in fish feed readily fulfills the energy requirements of the fish, thus enabling the protein in the feed to be used predominantly for growth rather than catabolism. Third, the endogenous oil minimizes the necessity to add extraneous oil, which is expensive, when the product is presented as feed to animals. The oil present in the product 100 also enables the product to be more readily pressed into pellets or blocks without the addition of extraneous binder materials.

Referring further to FIG. 1, raw animal parts 12 first pass through the mulling stage 10 wherein the raw animal parts 12 are first reduced to a ground condition, generally by passing through a grinder 14 or analogous device. As suggested in FIG. 1, the grinder 14 reduces not only the proteinaceous component of the animal parts 12 to a ground condition, but also any bones, scales, and other parts associated therewith. As used herein, a "ground condition" is a particulate form, wherein each particle has a diameter within a range of about 1/16 inch to ½ inch. Preferably, the particles have a median diameter of about ¼ inch.

After grinding, the ground animal parts are passed 16 into a transfer bin 18. The transfer bin 18 serves to even out the flow of material passing through the grinder 14, since grinders and analogous mulling devices typically do not process material with a constant-flow throughput. Ground animal parts contained in the transfer bin 18 gravitate toward an auger 22 rotated about its longitudinal axis, or analogous mass-conveying apparatus, thereby urging the ground animal parts toward a first positive-displacement pump 24. The pump 24 is typically a rotary vane type, but any type of pump exhibiting positive-displacement and constant-flow delivery may be used. The first pump 24 propels the ground animal parts through a conduit 26 to the inlet 28 of a heat exchanger 32. A requisite accurate hydraulic flowrate through the heat exchanger 32 is governed by presetting and accurately controlling the pumping rate of the first pump 24.

After completion of the mulling stage 10 comprised of the steps described above, the resulting suspension of ground animal parts enters the protein-hydrolysis stage 20. In this stage, the proteins in the suspension are enzymatically hydrolyzed at a temperature conducive for such hydrolysis without denaturing the protein.

Unless the suspension of ground animal parts is intended to be digested using endogenous proteolytic enzymes, it will be necessary to add extraneous proteolytic enzymes 34 to the suspension. In general, addition of extraneous enzymes 34 is preferred to ensure consistency of the overall process and the ability of the process to yield product 100 having desired predictable characteristics. The extraneous enzymes 34 are preferably of a type generally known as proteolytic or peptide-hydrolyzing enzymes, such as papain and the like. Proteolytic enzymes cleave the large protein molecules of the ground animal parts into smaller molecules by hydrolyzing peptide bonds along the protein backbone. If extraneous enzymes 34 are required, they are preferably added just before the suspension of ground animal parts enters the heat exchanger 32. Passage through the heat exchanger 32 imparts a mixing action to the suspension, which aids the dispersal of the enzymes throughout the suspension.

The extraneous enzymes 34 can be a commercially available preparation such as "Corolase L 10" produced by Röhm Gmbh, Postfach 4242, Kirschenallee, D-6100, Darmstadt, Federal Republic of Germany. In the case of fish, the amount of this preparation required is about 300 to 400 mL per 1000 pounds of raw fish parts. More enzyme may be required when processing parts from terrestrial animals such as bovine parts. Preferably, the extraneous enzymes are added to the suspension using an accurate pump (not shown) having a suitable flowrate without causing enzyme denaturation.

The amount of water in the suspension of ground animal parts at this stage of the process is generally dictated by the naturally occurring amount of water present in the raw animal parts 12. With fish, for example, the natural water content is about 75%. Usually, it is not necessary to add additional water. Additional water may be indicated, however, if the suspension of ground animal parts is too viscous or contains a large amount of solids such as bone. If additional water is required, it is preferably metered in just after the suspension enters the first pump 24.

Aside from extraneous proteolytic enzymes 34 as required, it is not necessary at this stage in the present process to add any other ingredients to the suspension. For example, no extraneous buffering or pH-adjusting ingredients are necessary. The natural pH of the suspension is sufficient, generally within the range of 6 to 6.5.

To trigger proteolytic action, the suspension of ground animal parts and enzymes should be preheated to a temperature conducive for hydrolytic activity of the enzymes, generally within a range of about 140° to about 150° F. A temperature of about 140° F. is optimal for endogenous proteolytic enzymes whereas a temperature of about 150° F. is optimal for extraneous enzymes such as papain. Hence, if one wishes to suppress action of endogenous enzymes when extraneous enzymes 34 are added, the suspension should be preheated to about 150° F. A temperature in excess of about 150° F. is disadvantageous because exceeding 150° F. causes both protein denaturation and enzyme deactivation to occur. A temperature lower than about 140° F., while not necessarily disadvantageous, will necessitate a longer time to achieve a desired degree of protein hydrolysis during the subsequent enzymatic hydrolysis step (described below).

The heat exchanger 32 is a preferred means for warming the suspension. The heat exchanger 32 is typically comprised of an inner chamber 36 through which the suspension is passed. The inner chamber 36 is surrounded by a separate outer chamber 38 through which a hot fluid heat-exchange medium is passed. As shown in FIG. 1, the outer chamber 38 is hydraulically coupled to a source 42 of heat-exchange medium, such as hot water or steam.

The heat-exchange medium should be hotter than the desired temperature of the suspension. If steam is used as a heat-exchange medium instead of hot water, a smaller heat exchanger may be used because steam is hotter than boiling water. However, use of steam has several drawbacks. First, steam requires that the outer chamber 38 be capable of withstanding higher pressures than would be required if hot water were used. Also, steam can be more difficult to control than hot water. Finally, use of steam yields a greater probability of "hot spots" in the inner chamber 36 which can cause undesired denaturation of the protein and deactivation of the enzymes. As a result, hot water heated to about 180° to about 200° F. is preferred over steam as a heat exchange medium. (The actual water temperature required will depend on many factors, including suspension flowrate, surface area of the inner chamber 36, and the desired suspension temperature to be attained.) Hot water also requires no substantial pressure capability of the outer chamber 38. The main disadvantage of using hot water is that a larger and consequently more expensive heat exchanger is required.

The heat exchanger 32 preferably includes wall-scraping paddles 44 or the like which are rotated at moderate to high speeds inside the inner chamber 36 to impart a mixing action to the suspension as it passes through the inner chamber 36. Mixing ensures even preheating without overheating as well as dispersal of the enzymes throughout the suspension.

Since the first pump 24 propels the ground suspension of animal parts at a preset constant hydraulic flowrate, the transit time of the ground suspension through the heat exchanger 32 is accurately known. This is important because the longer the suspension resides in the heat exchanger, the hotter the suspension becomes. Accurate hydraulic flowrate ensures that the ground suspension is preheated only to the desired digestion temperature and no hotter or cooler.

After exiting the heat exchanger 32, the preheated ground suspension of ground animal parts, now termed a "predigestion mixture," is conducted to a first digester 46. Preferably, multiple digesters are used to achieve the desired degree of protein hydrolysis, where each digester is coupled end-to-end (i.e., in series). FIG. 1, for example, shows three digesters 46, 48, and 52 connected in series. Although a single large digester could be used, a series of smaller digesters is preferable because much tighter control over the degree of hydrolysis is possible with multiple small digesters than with a single large digester. The multiple, small diameter digesters also reduce the possibility of non-digestible solids settling out which would change the effective volume of the digesters and could cause clogging.

Small elongated digesters, such as shown in FIG. 1, are also advantageous in that they greatly facilitate a desirable "plug flow" passage of material through the digester. "Plug flow" denotes flow behavior in which each quantum of suspension flows over the same path length through the digester. Plug flow ensures that each quantum of suspension passes through the digester in substantially the same amount of time, thereby preventing overdigestion or underdigestion of any portion of the suspension. In this way, the number-average molecular weight of the partially hydrolyzed protein molecules comprising the product 100 can be tightly controlled to a predetermined value, thereby ensuring maximal nutritive value and resistance to oxidation of the product 100. Plug flow also permits more rapid digestion than with prior-art methods.

A general target value for the number-average molecular weight is within a range of about 15,000 to about 30,000 daltons, but other values can be selected and reliably achieved, depending upon the intended use of the product 100. A key benefit of carefully controlling the degree of protein hydrolysis is that minimal changes are imparted to amino acids comprising the animal protein in the product 100, thereby maximizing nutritive value of the product 100.

The number of series-connected digesters can vary, depending upon a number of factors, including the source of the animal parts, the water content, the desired volume throughput, the digestion temperature, the type and concentration of enzymes, the capacity of each individual digester, and the degree of digestion desired. In any event, use of multiple digesters achieves faster digestion to the desired degree of hydrolysis than a single larger digester exhibiting a transit time for liquid throughout equal to the collective transit times of the group of smaller digesters. In FIG. 1, each digester 46, 48, 52 has a volumetric capacity configured such that a quantum of suspension passes through a digester in about 20 to 40 minutes' transit time.

Referring further to FIG. 1, it is preferable that each digester 46, 48, 52 be equipped with plural rotatable paddles 54 or analogous mixing apparatus. The paddles 54 are rotated about the longitudinal axis of the corresponding digester to prevent channeling of the digestion mixture as it passes through the digester. It is important that the paddles not be rotated too rapidly which can cause over-mixing and interruption of plug flow. The paddles are preferably oriented such that, as they are rotated, the paddle edges slice through the mixture passing through the digester instead of the flat faces of the paddles. The outer edges of the paddles 54 are preferably bent at 90° angles toward the ends of each digester to effect a mild wiping of suspension from the walls as the paddles 54 are rotated. Orienting the paddles 54 substantially edgewise represents a significant departure from prior-art processes and helps achieve the accurate degree of partial protein hydrolysis attainable with the present method. The paddles 54 also prevent non-digestible solids such as bone particles from settling along the bottom of each digester which may lead to clogging.

The digesters are preferably insulated, either collectively as shown in FIG. 1, or individually. The insulation 56 helps maintain the optimal temperature for enzymatic digestion as the suspension passes through the digesters. The temperature inside each digester can be measured and displayed by thermometers 58 or analogous devices.

Alternatively, the heat exchanger 32 may be eliminated and each digester separately or collectively heated (not shown), essentially combining the function of the heat exchanger 32 with each digester 46, 48, and 52.

Passing through the digesters transforms the predigestion mixture into an aqueous suspension of partially hydrolyzed animal parts. Enzymatic digestion in the digesters breaks up the particles of ground animal parts comprising the predigestion mixture into a somewhat milky consistency, due to the partial protein hydrolysis. A key benefit of the partial hydrolysis of the present method is that the resulting aqueous suspension of partially hydrolyzed animal parts is no longer subject to denaturation. This is important because downstream process steps require higher temperatures that would denature non-hydrolyzed proteins.

The aqueous suspension still contains active enzymes. We have discovered that it is preferable to deactivate the enzymes immediately after passage of the suspension through the digesters. Deactivating the enzymes stops further protein hydrolysis which may otherwise occur downstream of the digesters. We have also discovered that heating the aqueous suspension is a preferred way to deactivate the enzymes. Heating may be effected by controllably injecting steam directly into the suspension. For example, in FIG. 1, live steam from a steam source 62 is injected into a conduit 63 conducting the aqueous suspension away from the last digester 52. An alternative to injection of steam would be to pass the aqueous suspension through another heat exchanger for further heating (not shown). Other heating apparatus known in the art may also be used.

To heat-deactivate the enzymes, the aqueous suspension is preferably heated to a temperature within a range of about 175° to about 200° F. Such heating also has the important benefit of reducing the viscosity of the suspension. Even at digestion temperature, the suspension still comprises solid fatty material that could cause clogging downstream in the screening stage 30. We have discovered that heating the suspension to about 175° to 200° F., sufficient for enzyme deactivation, also renders any fatty solids present in the suspension to liquids which greatly decreases the chance of clogging. Such heating performed just downstream of the last digester 52 is particularly important because the aqueous suspension subsequently enters the screening stage 30 of the process where clogging due to fatty solids would otherwise be especially likely. Screening stages and the like in prior-art methods are particularly prone to clogging due at least in part to the presence of solid fatty material that has a tendency to obstruct flowpath orifices. This problem seems to be especially troublesome in prior-art methods for processing chicken parts. With the present method, the post-digestion heating step has permitted even the processing of chicken parts into product 100 without clogging.

We have found that the temperature should be at least about 175° F. to ensure liquefaction of fats. Temperatures higher than about 200° F. do not appear to confer any greater benefit than temperatures between about 175° and about 200° F. A temperature within the range of 190° to 200° F. is generally optimal for poultry, and a temperature within the range of 175° to 185° F. is generally optimal for fish.

The post-digestion heating step in the present method also permits the processing of more concentrated suspensions of ground raw animal parts than prior-art methods. Many prior-art methods require that the suspension of ground animal parts be diluted to minimize clogging. Since the present process is more resistant to clogging, dilution is usually not necessary. If dilution is required, it is because the suspension is extremely viscous or too laden with non-digestible solids even to permit pumping.

In the screening stage 30, the heated aqueous suspension is preferably passed through an inclined vibrating screen 64 which separates non-digestible solids 66 from the liquid 68 passing through the screen 64. Typically, the screen size is between 40 and 60 meshes per inch. The vibration and inclined orientation of the screen 64 facilitate liquid passage therethrough while keeping the screen free of non-digested solids 66 that do not pass through. The non-digestible solids can be dried and further processed into bone meal and similar products (not shown).

If necessary, a spray (not shown) of hot water (175° to 200° F.) can be directed at the screen to recover hydrolyzed protein that would otherwise adhere to the non-digestible solids. This results in a higher product recovery and "cleaner" non-digestible solids but adds additional water to the suspension which will have to be removed later in the concentration stage 40.

As an alternative to the vibrating screen 64, other analogous devices may be employed for removing the non-digestible solids 66. For example, a basket centrifuge or vacuum screen may be used (not shown). However, the vibrating screen 64 has the advantages of low cost and inherent simplicity over alternative devices such as a centrifuge.

The present method does not usually require recirculation back through the digesters of a portion of the aqueous suspension after passing out of the last digester. This is in contrast with many prior-art methods employing such recirculation to prevent clogging or to achieve a greater degree of digestion. With the present method, the combination of accurately controlled protein hydrolysis combined with post-digestion heating generally renders recirculation unnecessary. Also, recirculation is undesirable because it results in increased protein hydrolysis of a portion of the suspension which negates the benefit achieved with carefully controlled digestion: namely, high-quality partially-hydrolyzed protein in the product 100. The only instances in which recirculation may be indicated are when the raw animal parts 12 comprised a very high proportion of non-digestible solids such as bone or shells as found in shrimp waste. However, even in these instances, a problem with excessive viscosity due to large amounts of bone or shells can usually be solved by merely supplying additional water to the suspension.

When necessary, recirculation (not shown) is preferably effected by removing a portion of the aqueous suspension of partially hydrolyzed protein and oils downstream of the screen 64 for return to either the transfer bin 14 or just upstream of the first digester 46. A pump would generally be required (not shown). Although recirculation results in a portion of the protein being at least double-digested, it does enable some types of raw animal parts 12 to be processed that otherwise would be impossible.

The liquid 68 passing through the screen 64, comprised of an aqueous suspension of partially hydrolyzed protein and oils, is collected and routed to a surge tank 70 which essentially serves as a holding vessel. The surge tank 70 is necessary because the hydraulic flowrate out of the digesters is sometimes uneven and the downstream concentration stage 40 of the present method requires a substantially constant hydraulic flowrate.

To begin the subsequent concentration stage 40, the heated aqueous suspension of partially hydrolyzed protein and oils collected in the surge tank 70 are withdrawn from the surge tank 70 via a positive-displacement second pump 72 having an accurate volumetric pumping rate. Preferably, pump 72 is a peristaltic type but other types can be employed such as a rotary vane type if some means for assuring accurate volumetric flow therethrough is included, such as a flow control valve (not shown). The choice of pump type will also depend upon the desired volume throughput, since peristaltic pumps are generally only usable at relatively low flowrates.

Figure 2:
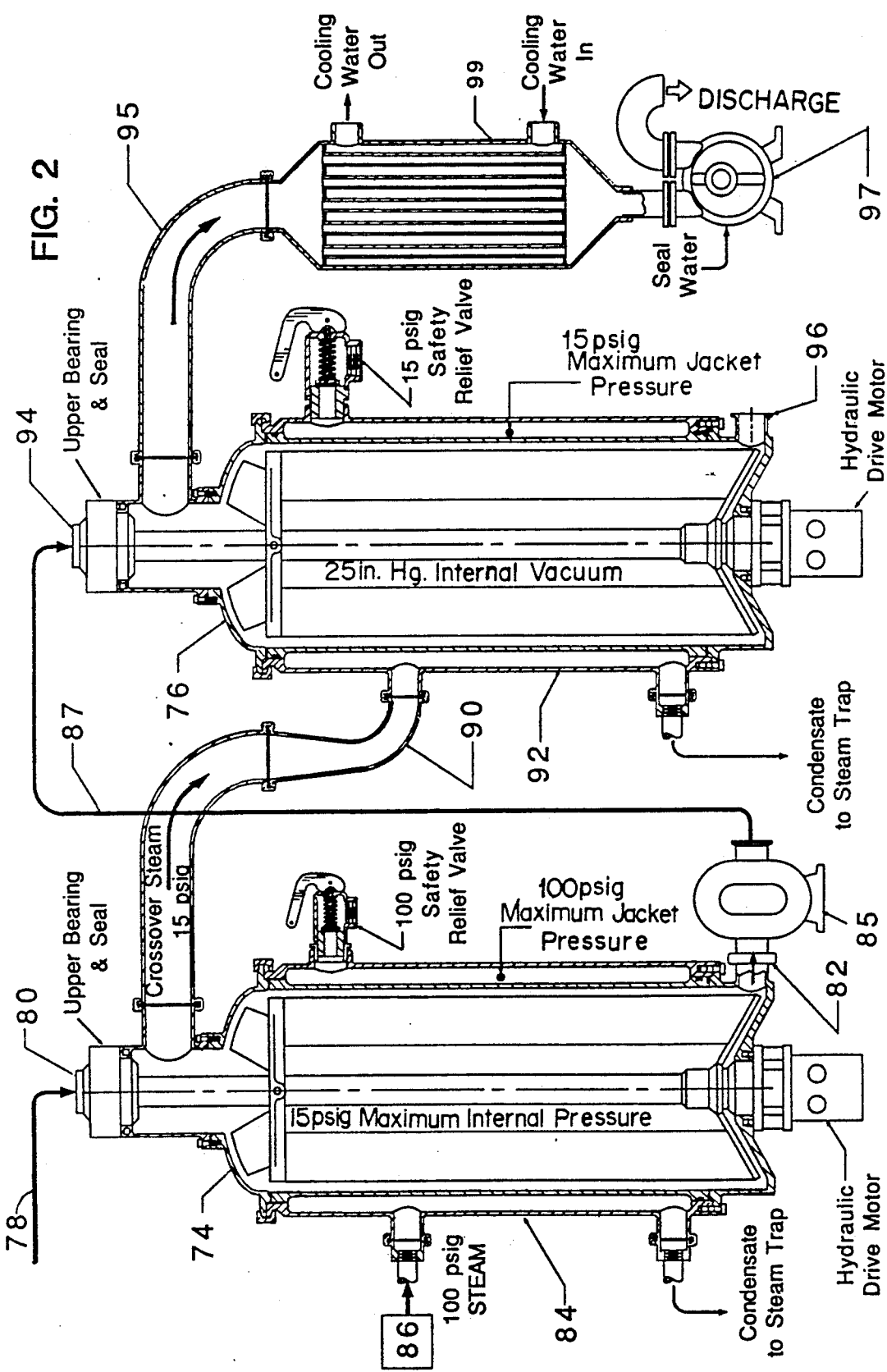
FIG. 2 is a close-up view of a portion of the FIG. 1 embodiment, showing sectional views of the first and second evaporators together with nearby equipment coupled thereto.

The concentration stage 40 preferably includes a first evaporator 74 and a second evaporator 76 coupled in series downstream of the second pump 72. The first evaporator 74 serves generally as an apparatus for both pasteurizing the aqueous suspension and removing a substantial portion of the water therefrom. The second evaporator 76 completes the desired degree of water removal. The evaporators are arranged relative to each other in what is known in the art as a "double effect" configuration which greatly reduces the amount of energy needed to remove the desired amount of residual water from the protein-oil suspension. In a "double effect" configuration, as shown in FIG. 1 and FIG. 2, the vapor evolved from the first evaporator 74 is used as the heating medium in the subsequent second evaporator 76. Each evaporator 74, 76 in such a configuration is called an "effect." Other configurations such as "triple effect" and "recompression" can also be used which are even more energy efficient than "double effect." The number of "effects" employed depends upon the available overall temperature difference and upon the economics of the process, where additional "effects" result in capital cost increases which may offset the savings achieved in energy costs.

Both evaporators 74, 76 are preferably of a "wiped-film" type. They are vertically oriented where the liquid to be pasteurized and concentrated, respectively, enters at the top and exits at the bottom. As an alternative to wiped-film evaporators, shell-and-tube or plate evaporators known in the art may be used but are much more prone to fouling and clogging and have longer residence times which can result in protein degradation and oil oxidation.

As another alternative embodiment, it is possible to use only one evaporator (not shown). But, such a single evaporator must be capable of performing both pasteurization and the requisite degree of water removal. Alternatively, a single evaporator may be used solely for water removal and some other type of apparatus used for pasteurization upstream of the single evaporator. This arrangement is less preferable because it requires more energy to remove the same amount of residual water.

Referring further to FIG. 1, after passing through the second pump 72, the heated aqueous suspension of partially hydrolyzed protein and oils is passed through a conduit 78 in which the suspension is combined with a controlled-flow stream of oil removed from the suspension at a downstream step and pumped through a conduit 79 (discussed in detail below). The addition of oil converts the aqueous suspension of partially hydrolyzed protein and oils to a protein-oil suspension. This addition of oil represents a novel departure from prior-art methods. The added oil allows most of the water to be removed when the suspension subsequently passes through the evaporators 74, 76 without the product becoming an unpumpable stiff paste that would clog the evaporators.

The protein-oil suspension is conducted through the conduit 78 to a top end 80 of the first evaporator 74. From the top end 80, the protein-oil suspension passes vertically downward through the first evaporator 74 to the bottom end 82 thereof. The first evaporator 74 is jacketed by an outer chamber 84 through which is passed a heating medium such as steam from an extraneous source 86. The outer chamber 84 is in surrounding relationship to an inner chamber (not shown) through which passes the protein-oil suspension from the top end 80 to the bottom end 82 of the first evaporator 74.

As the protein-oil suspension propelled by the second pump 72 is passed through the first evaporator 74, it is preferably heated to a pasteurization temperature of about 200° to about 250° F. at 0 to 15 psig pressure for the about 10- to 20-second time period (transit time) required for the suspension to pass through the first evaporator 74. The transit time is predetermined and dictated by the pumping rate of the second pump 72 and the volumetric capacity of the first evaporator 74. The pressure setting of a control valve 89 dictates the temperature at which the suspension leaves the first evaporator 74 since the higher the pressure of the suspension, the higher the temperature at which the protein-oil suspension will boil. As the protein-oil suspension passes through the first evaporator 74 and becomes pasteurized, the heating imparted to the suspension therein also causes a substantial portion of the water to be removed from the suspension.

The inner chamber of the first evaporator 74 preferably includes an array of scraping or wiping blades 81 rotatable about the vertical longitudinal axis of the first evaporator 74. Alternatively, an analogous device for gentle agitation of the suspension passing through the first evaporator 74 may be used. The array of blades 81, which can be of conventional design, is rotated at high speed as the suspension passes through the first evaporator 74. Such agitation increases heat transfer efficiency and prevents localized overheating of the suspension. The resulting increased thermal transfer efficiency allows for use of a smaller and less costly evaporator.

After leaving the first evaporator 74 through the bottom end 78 thereof, the pasteurized protein-oil suspension passes through an evaporator transfer pump 85 which is preferably a positive-displacement rotary type. The evaporator transfer pump 85, pumping at a higher volumetric rate than the second pump 72, ensures that the first evaporator 74 does not fill up. Such continuous unloading of the first evaporator 74 is important to prevent a long residence time of the protein-oil suspension passing therethrough. Continuous unloading is also important because it is not possible to visualize actual passage of the suspension through the first evaporator 74.

Vapor from the first evaporator 74 is conducted through a conduit 88, through the control valve 89, and through a conduit 90 to an outer jacket 92 of the second evaporator 76. This yields an energy-efficient process in which maximal heat is recovered from the steam. The control valve 89 (not shown in FIG. 2) is not required. But, this valve is preferred especially if the second evaporator 76 is sufficiently large to utilize all the vapor produced by the first evaporator 74.

The pasteurized protein-oil suspension, after passing through the evaporator transfer pump 85, is conducted through a conduit 87 to a first end 94 of the second evaporator 76. As soon as the pasteurized suspension enters the second evaporator 76, it is subjected to a subatmospheric pressure of about 15 to 25 inHg which immediately lowers the temperature of the suspension to within a range of about 150° to about 160° F. The subatmospheric pressure is generated using a vacuum pump or analogous device (97 in FIG. 2) coupled to a conduit 95, preferably employing a condenser (99 in FIG. 2) coupled between the vacuum pump 97 and the second evaporator 74. The condenser 99 condenses the water vapor leaving the second evaporator 76 and thus reduces the size of vacuum pump required. The condenser 99 also precipitates many of the odoriferous compounds released by evaporation, thereby preventing their release into the atmosphere.

As the protein-oil suspension passes through the second evaporator 76, the suspension undergoes mild reheating to an exit temperature of about 175° to 200° F. as more water is removed therefrom. The suspension exits the second evaporator 76 at the latter temperature through a bottom end 96 thereof and an evaporator discharge pump 98 coupled to the bottom end 96. The exit temperature is directly related to the moisture level of the protein-oil suspension. The less moisture left in the suspension, the higher the exit temperature. Close monitoring of the exit temperature, in conjunction with monitoring of the temperature of the water vapor exiting the second evaporator through a conduit 95, gives a direct indication of the amount of reheating of the suspension taking place in the second evaporator 76. Thus, such temperatures serve as an indication of the amount of residual moisture remaining in the protein-oil suspension. Temperature rises of 10 to 30° F. in the second evaporator 76 will result in final product moisture levels of 10 to 15 percent.

Since extraneous air is excluded from the protein-oil suspension as it passes through the evaporators 74 and 76, the possibility of oil oxidation is greatly reduced. As a result, the formation of odor-causing compounds is also reduced.

Another parameter affecting the temperature of protein-oil suspensions after passing through the second evaporator 76 is the level of subatmospheric pressure applied thereto. The lower the pressure, the greater the temperature drop of the suspension upon entering the second evaporator 76 and, consequently, the lower the temperature upon leaving the second evaporator 76.

The temperature at which moisture is evaporated from the suspension as it passes through the second evaporator 76 is critical when processing suspensions derived from certain animal sources. For example, waste from Tilapia genera of fish as well as species such as black cod produce suspensions that become unacceptably gummy when heated too high.

As can be seen, controlling the several parameters affecting temperature rise of the suspension passing through the second evaporator 76 directly affects the consistency and degree of water loss from the protein-oil suspension.

The protein-oil suspension exiting the bottom end 96 of the second evaporator 76 is in the form of an oleaginous suspension of partially hydrolyzed protein. Dehydration of the suspension via passage through the first and second evaporators 74, 76 causes a portion of the partially hydrolyzed protein to self-agglomerate into proteinaceous granules suspended in an oil medium.

The oleaginous suspension then enters the oil separation stage 50 of the process. In this stage, a large portion of the oil is removed from the suspension, yielding a continuous stream of oil of which a portion is recirculated back to the conduit 78 upstream of the first evaporator 74, as discussed above. The oil separation stage 50 also yields the final product 100 in a substantially dry, particulate form comprising partially hydrolyzed, non-denatured animal protein.

Just as oil addition represents a novel departure from the prior art, oil removal as a final step after removal of water from the suspension also represents a novel departure from prior art methods in which water removal or dehydration is usually the final process step. As discussed above, the added oil permits the bulk of the water to be removed from the suspension in the evaporators 74, 76 without forming a stiff immovable mass of residual proteinaceous material. Subsequent removal of a large portion of the oil forms a product 100 that is granular (flaky) rather than a large agglomerated mass that must be fragmented. The flakes form naturally without the need for a separate fragmentation step such as spray-drying.

Oil removal is preferably achieved by passing the oleaginous suspension through an oil-separation centrifuge 102. As the suspension is fed into the centrifuge 102, a large portion of the oil is removed and passed out of the centrifuge 102 through a conduit 104 to a holding tank 106. As the oil is removed, the partially hydrolyzed, non-denatured protein in the suspension is converted into the desired flaky granular product 100 which is also passed out of the centrifuge 102.

A portion of the oil collected in the holding tank 106 is withdrawn therefrom through a conduit 108 using a peristaltic or analogous positive-displacement oil pump 110 which delivers the oil at a preset flowrate into the conduit 78 upstream of the first evaporator 74. Excess oil remaining in the holding tank 106 is withdrawn and collected 112 for other commercial uses.

The amount of oil removed from the suspension via passage through the centrifuge 102 is governed by several variables involving the centrifuge 102 including the rotational speed, the volumetric capacity, and the maximum allowable throughput rate. The amount of oil removed is also determined by the product itself, where a suspension having a relatively high moisture level (10 to 15%) will result in a relatively low product oil level (20 to 25%) and a suspension having a relatively low moisture level (6 to 10%) will result in a relatively high product oil level (30 to 35%). Achieving a moisture content of less than about 8% (w/w) causes difficulty in passing the resulting proteinaceous product out of the centrifuge 102.

The typical product 100 produced by the present method from fish waste has a moisture content within a range of about 10 to about 15% (w/w), an oil content within a range of about 20 to about 35% (w/w), a protein content within a range of about 40 to about 60% (w/w), and an ash content within a range of about 0 to about 7% (w/w). The relatively high oil content in contrast with other particulate high-protein products makes the product 100 generally more appealing to animals and seems to allow a higher moisture content than, for example, conventional fish meal without spoilage of the product 100. In other words, prior-art fish meals containing almost no oil will usually exhibit substantial growth of molds and the like if the moisture content is above about 10%. (Typically, fish meals have a moisture content of about 6 to 8 percent.) The product 100, in contrast, even while having a moisture level of about 13 percent, is relatively resistant to mold growth.

However, the main reason why the product 100 is believed to be more resistant to molding at a water content greater than about 10 percent is because the partially hydrolyzed protein tends to tie up a substantial amount of water in a form unavailable for biological growth. This is in contrast with existing fish meals, comprised mostly of protein in a denatured (at least partially cooked) form which ties up less water. Tying up water is desirable not only because storability is improved but because the product also carries this water-binding capacity with it when added to or used as a feed, allowing a higher moisture content in the feed. A higher moisture level in a feed will often improve its acceptability by animals intended to consume the feed.

If desired, antioxidants and mold-inhibitors can be added to the product 100 for enhanced stability, especially for long-term storage or storage under particularly humid conditions. Representative antioxidants include butylated hydroxyanisole (BHA), butylated hydroxytoluene (BHT), and ethoxyquin. A representative mold-inhibitor is potassium sorbate.

The product 100 is also superior to existing fish meals and the like because of the low amount of ash therein. "Ash" denotes non-combustible mineral-laden residues derived principally from bones. Production of fish meal often does not include a bone-removal step. High amounts of ash as found in many fish meals are particularly undesirable for consumption by cats because of urinary problems caused by excess ash in the diet.

The product 100 also has other advantages over conventional fish meal. Since the oil and hydrolyzed protein all passed through a 40- to 60-mesh screen during bone separation, the product 100 needs no further grinding. Fish meal typically must be ground in a hammer mill or the like before the meal can be added to a feed. This grinding step is expensive and can greatly accelerate oil oxidation in the meal. Even when the product 100 has been pelletized, it can easily be broken up into a fine powder by simple agitation in a mixer. The product 100 also has the ability to bind ingredients of a feed together and thus reduces the need for expensive binders.

The product 100 derived from various animal sources is remarkably consistent with respect to the relative contents of moisture and oil. The oil content tends to be about double that of water, and the sum of the oil and water contents tends to be within the range of about 40 to 45 percent w/w. This constancy is maintained automatically despite varying levels of fats, oils, and water in different types of raw animal parts used to make the product 100. Even in fish, the fat levels can vary appreciably, depending for example upon the species, the time of year when the fish were caught, and the water temperature. Nevertheless, product 100 made from different types of fish caught during different seasons consistently includes about 20 to 35% (w/w) oil and about 10 to 15% (w/w) water. One reason for such constancy is that, as the moisture level changes, the oil content during processing will adjust accordingly to yield the same ratio. Also, the percentage w/w of oil and moisture appears to be dictated in part by the capability of the centrifuge 102, which operates satisfactorily within a level of about 8 to 20% moisture in the product. If too much water is present, the protein is insufficiently agglomerated into particles, resulting in partially hydrolyzed protein tending to pass out of the suspension with the oil. If the moisture level is too low, the particles of partially hydrolyzed protein tend to become too tightly packed in the centrifuge 102, resulting in too much oil remaining in the product and difficulty in passing the product out of the centrifuge 102.

It has surprisingly been found that the product 100, even in a loose flaky form, has a lower tendency to oxidize than known fish meals and many other types of high-protein products of similar origin. The reason for this is not entirely clear but is probably due in part to the enhanced degree in which protein digestion is controlled in the present method, in contrast with prior-art methods. It is believed that this may be due to the formation by the hydrolyzed protein of polymers with the oil making the product 100 more resistant to oxidation. Also, the high oil content and/or moisture relative to prior-art products is believed to be instrumental in inhibiting oxidation.

The color of the product 100 is generally a golden brown. The product 100 normally has a slight odor, where the particular odor is dictated by the type of raw animal parts 12 used. For example, if derived from fish, the odor is characteristically slightly fishy. However, the product 100 does not have the strong, objectionable fishy odor characteristic of fish meals found in the prior art.

The product 100 has a number of uses, depending in part on the type of animal from which the protein was derived. In general, it may be used as a high protein food additive or supplement, particularly for other animals such as pets, cattle, swine, and poultry. It may also be used alone, such as for feeding aquaculture-raised fish.

The product 100 has excellent storage properties and may be transported and stored in bulk quantities. Although the product is not hygroscopic, it is important to make sure that the moisture content be kept at about 10 to 15 percent (w/w) which is the normal endogenous moisture level of the product. Therefore, special precautions may have to be taken when transporting and storing in wet or humid environments to keep the product dry. Otherwise, no special atmospheric conditions for storage are required. Keeping the moisture level within endogenous levels prevents mold growth without needing to add mold inhibitors to the product.

Although the product is not sterile after manufacture, it is pasteurized, which means that substantially all harmful microorganisms have been eliminated therefrom.

Example 1

A batch of product 100 was produced from raw fish parts 12 using the process shown in FIG. 1. Various analytical tests were performed on the finished product 100 and of samples of the suspension removed at various points in the FIG. 1 process. Samples are labeled as follows:

| Sample | Source |
|---|---|
| A | raw fish waste |
| B | after digestion |
| C | non-digestible solids |
| D | after passing through vibrating screen |
| E | after passing through first evaporator |
| F | after passing through second evaporator |
| G | finished product |

Amino acid analysis were performed by high-performance liquid chromatography (HPLC), with the following results:

| Amino Acid Analysis*: Percent Composition (% wt/wt)** | | | | |
|---|---|---|---|---|
| Amino Acids | Sample A | Sample B | Sample E | Sample G |
| Alanine | 1.26 | .878 | 1.36 | 3.47 |
| Arginine | 1.26 | .941 | 1.41 | 3.71 |
| Aspartic acid | 1.37 | 1.22 | 1.86 | 4.93 |
| Cystine/2*** | .154 | .114 | .171 | .491 |
| Glutamic acid | 1.86 | 1.89 | 2.72 | 7.26 |
| Glycine | 2.70 | 1.17 | 1.81 | 4.45 |
| Histidine | .262 | .265 | .408 | 1.12 |
| Isoleucine | .499 | .514 | .861 | 2.16 |
| Leucine | .984 | .992 | 1.58 | 4.05 |
| Lysine | .924 | 1.05 | 1.66 | 4.35 |
| Methionine | .372 | .354 | .539 | 1.43 |
| Phenylalanine | .558 | .484 | .805 | 2.05 |
| Proline | 1.40 | .747 | 1.12 | 3.00 |
| Serine | .975 | .691 | 1.02 | 2.64 |
| Threonine | .653 | .610 | .993 | 2.44 |
| Tryptophan**** | .0678 | .0660 | .0935 | .380 |
| Tyrosine | .352 | .408 | .651 | 1.73 |
| Valine | .718 | .630 | .966 | 2.61 |
| TOTAL | 16.4 | 13.0 | 20.0 | 52.3 |

*20-hour acid hydrolysis.
**Calculated using amino acid molecular weight.
***Performic acid oxidized prior to acid hydrolysis. Calculated from cysteic/alanine ratio.
****48-hour alkaline hydrolysis @ 135° C., method of Hugli and Moore, J. Biol. Chem. 247:2828 (1972).

Metal/mineral scans were performed by the inductively-coupled plasma (ICP) method, with the following results (ND=none detected);

| ICP Scan, concentration mg/kg | | | | |
|---|---|---|---|---|
| Metal | Sample A | Detection Limit mg/kg | Sample C | Detection Limit mg/kg |
| Al | ND | 0.99 | ND | 0.99 |
| Ca | 17100 | 0.99 | 105000 | 0.99 |
| Co | ND | 0.39 | ND | 0.40 |
| Cr | ND | 0.39 | 2.1 | 0.40 |
| Cu | 0.73 | 0.20 | 0.20 | 0.20 |
| Fe | 12.8 | 0.99 | 5.9 | 0.99 |
| Mg | 492 | 2.0 | 1370 | 2.0 |
| Mn | 0.56 | 0.099 | 2.11 | 0.099 |
| P | 12400 | 9.9 | 72200 | 9.9 |
| Sr | 102 | 2.0 | 413 | 2.0 |
| Zn | 14.6 | 0.20 | 36.3 | 0.20 |
| Metal | Sample D | Detection Limit mg/kg | Sample G | Detection Limit mg/kg |
| Al | ND | 0.98 | 3.1 | 1.00 |
| Ca | 690 | 0.98 | 5030 | 1.00 |
| Co | ND | 0.39 | ND | 0.40 |
| Cr | ND | 0.39 | ND | 0.40 |
| Cu | 0.78 | 0.20 | 2.58 | 0.20 |
| Fe | 15.9 | 0.98 | 65.7 | 1.00 |
| Mg | 238 | 2.0 | 1040 | 2.0 |
| Mn | ND | 0.098 | 0.62 | 0.100 |
| P | 1620 | 9.8 | 8210 | 10.0 |
| Sr | 14 | 2.0 | 71.6 | 2.0 |
| Zn | 7.96 | 0.20 | 35.7 | 0.20 |

Sodium and potassium levels were determined by atomic absorption spectroscopy, with the following results:

| Atomic Absorption Spectroscopy, concentration mg/kg | | | | |
|---|---|---|---|---|
| Metals | A | C | D | G |
| Na | 2560 | 3370 | 2520 | 9190 |
| K | 1610 | 1190 | 1720 | 5760 |

Molecular weight distributions were determined by size-exclusion chromatography, with the following results:

| Molecular Weight Distribution: | |
|---|---|
| Molecular Weight Component | Relative Percent |
| Sample A | |
| 200000+ | 100% |
| Sample D | |
| 19700 | 100% |
| Sample G | |
| 19700 | 79% |
| 15000 | 21% |

Percent water-soluble protein determinations were performed using the Coomassie Blue method with a colorimetric determination, with the following results:

| | % Water Soluble Protein Analysis: | |
|---|---|---|
| Sample # | % Protein (wt/wt) Sample-as received | % protein (wt/wt) Sample-dried |
| A | 1.01 | 3.47 |
| D | 1.00 | 4.15 |
| E | 0.72 | 1.22 |
| G | 0.56 | 0.62 |

Fatty-acid profiles as well as profiles of Omega 3 fatty acids were determined using capillary gas chromatography (AOAC method), with the following results:

| | Fatty Acid Profile: | | | |
|---|---|---|---|---|
| Fatty Acid % | A | D | E | G |
| Total Saturated | 2.2 | 1.4 | 4.2 | 6.6 |
| C4:0 TO C12:0 | all <0.1 | all <0.1 | all <0.1 | all <0.1 |
| C14:0 | 0.4 | 0.2 | 0.7 | 1.1 |
| C16:0 | 1.5 | 1.0 | 2.7 | 4.4 |
| C18:0 | 0.3 | 0.2 | 0.6 | 1.1 |
| C20:0 | <0.1 | <0.1 | 2.2 | <0.1 |
| C22:0 | <0.1 | <0.1 | <0.1 | <0.1 |
| Total Monosaturated | 3.0 | 1.7 | 3.9 | 7.4 |
| C16:1 | 0.7 | 0.4 | 1.1 | 1.8 |
| C18:1 | 1.9 | 1.1 | 2.2 | 4.9 |
| C20:1 | 0.4 | 0.2 | 0.6 | 0.7 |
| C22:1 | <0.1 | <0.1 | <0.1 | <0.1 |
| Total Polyunsaturated | 2.2 | 1.3 | 3.1 | 6.5 |
| C18:2 | 0.1 | 0.1 | 0.2 | 0.3 |
| C18:3 | 0.1 | <0.1 | 0.1 | 0.2 |
| C20:5* | 1.1 | 0.6 | 1.4 | 2.9 |
| C22:6* | 0.9 | 0.6 | 1.4 | 3.1 |

*Omega-3 Fatty Acid

Proixmate analyses (nutritional information) were determined using standard AOAC methods, with the following results (RDA=Recommended Dietary Allowance):

| Proximate Analysis-Nutrition Information: (suggested label data in parentheses) | | |
|---|---|---|
| | Per 100 grams | % RDA* per 100 g serving |
| Sample A | | |
| Protein, g | 16.05 (16) | 24.7 (25) |
| Fat, g | 12.22 (12) | |
| Carbohydrates, g (total) | 0.00 | |
| Calories, # | 179 (180) | |
| Moisture, g | 67.19 | |
| Ash, g | 4.54 | |
| Sample B | | |
| Protein, g | 13.69 (14) | 21.1 (20) |
| Fat, g | 10.18 (10) | |
| Carbohydrates, g (total) | 0.00 | |
| Calories, # | 150 (150) | |
| Moisture, g | 74.68 | |
| Ash, g | 1.45 | |
| Sample C | | |
| Protein, g | 19.03 (19) | 29.3 (30) |
| Fat, g | 7.84 (8) | |
| Carbohydrates, g (total) | 0.00 | |
| Calories, 190 | 152 (150) | |
| Moisture, g | 43.72 | |
| Ash, g | 29.41 | |
| Sample D | | |
| Protein, g | 12.30 (12) | 18.9 (20) |
| Fat, g | 8.60 (9) | |
| Carbohydrates, g (total) | 0.00 | |
| Calories, # | 130 (130) | |
| Moisture, g | 77.93 | |
| Ash, g | 1.17 | |
| Sample E | | |
| Protein, g | 21.73 (22) | 33.4 (35) |
| Fat, g | 24.51 (25) | |
| Carbohydrates, g (total) | 0.00 | |
| Calories, # | 314 (310) | |
| Moisture, g | 51.35 | |
| Ash, g | 2.41 | |
| Sample F | | |
| Protein, g | 32.51 (33) | 50.0 (50) |
| Fat, g | 54.85 (55) | |
| Carbohydrates, g (total) | 0.00 | |
| Calories, # | 633 (630) | |
| Moisture, g | 9.11 | |
| Ash, g | 3.53 | |
| Sample G | | |
| Protein, g | 51.92 (52) | 79.9 (80) |
| Fat, g | 31.12 (31) | |
| Carbohydrates, g (total) | 0.00 | |
| Calories, # | 502 (500) | |
| Moisture, g | 11.32 | |
| Ash, g | 5.64 | |

Having illustrated and described the principles of our invention in a principal and several alternative embodiments, it should be apparent to those skilled in the art that the invention can be modified in arrangement and detail without departing from such principles. We claim all modifications coming within the spirit and scope of the following claims.

We claim:

1. A method for preparing a proteinaceous product from raw protein-comprising animal parts, the method comprising the steps:

(a) reducing the raw animal parts to aground condition;

(b) hydrolyzing the proteins in the ground animal parts using proteolytic enzymes, where the hydrolysis is performed at a temperature within a range conducive for hydrolytic activity of the enzymes without denaturing the protein and for a time period sufficient to achieve a preselected degree of partial hydrolysis of the protein, to form an aqueous suspension of partially hydrolyzed animal parts;

(c) heating the aqueous suspension sufficiently to deactivate the proteolytic enzymes therein and convert fats therein to oils;

(d) separating and removing non-digestible solids from the heated aqueous suspension;

(e) adding oil to the heated aqueous suspension to form a protein-oil suspension;

(f) pasteurizing the protein-oil suspension; (g) reducing the concentration of water in the protein-oil suspension to form an oleaginous suspension of partially hydrolyzed protein; and (h) removing a portion of the oil from the oleaginuous suspension to form a particulate, partially hydrolyzed, non-denatured proteinaceous product.

2. A method for preparing a proteinaceous product as recited in claim 1 wherein the proteolytic enzymes are endogenous to the ground animal parts.

3. A method for preparing a proteinaceous product as recited in claim including the step of adding supplementary proteolytic enzymes after step (a) but before step (b).

4. A method for preparing a proteinaceous product as recited in claim 3 including the step of preheating the ground animal parts after step (a) but before step (b) to elevate the temperature thereof to within range conductive for hydrolytic activity of the enzymes without causing denaturation of the protein.

5. A method for preparing a proteinaceous product as recited in claim 4 wherein the ground animal parts are preheated to a temperature within the range of about 140° to about 150° F.

6. A method for preparing a proteinaceous product as recited in claim 4 wherein the ground animal parts are preheated after adding the supplementary proteolytic enzymes thereto.

7. A method for preparing a proteinaceous product as recited in claim 6 wherein the ground animal parts are preheated by passing the ground animal parts through a heat exchanger.

8. A method for preparing a proteinaceous product as recited in claim 7 including the step of agitating the ground animal parts during passage through the heat exchanger.

9. A method for preparing a proteinaceous product as recited in claim 4 including the step of passing the preheated ground animal parts through at least one digester in which the proteolytic enzymes partially hydrolyze the proteins in the ground animal parts.

10. A method for preparing a proteinaceous product as recited in claim 9 wherein the predigestion mixture is passed sequentially through multiple digesters.

11. A method for preparing a proteinaceous product as recited in claim 10 wherein the temperature of the predigestion mixture is maintained during passage thereof through the digesters within the range suitable for hydrolytic activity of the enzymes by thermally insulating each digester.

12. A method for preparing a proteinaceous product as recited in claim 10 wherein the preselected degree of partial protein hydrolysis is achieved by passing the predigestion mixture through each digester at a controlled flowrate in a plug-flow manner.

13. A method for preparing a proteinaceous product as recited in claim 10 including the step of agitating the predigestion mixture as it is passed through each digester.

14. A method for preparing a proteinaceous product as recited in claim 3 wherein the aqueous suspension of partially hydrolyzed animal parts is heated to a temperature within a range of about 175° to about 200° F. to deactivate the proteolytic enzymes therein and convert fats therein to oils.

15. A method for preparing a proteinaceous product as recited in claim 14 wherein the proteolytic enzymes are deactivated by injecting steam into the aqueous suspension of partially hydrolyzed animal parts.

16. A method for preparing a proteinaceous product as recited in claim 14 wherein the proteolytic enzymes are deactivated by passing the aqueous suspension of partially hydrolyzed animal parts through a heat exchanger.

17. A method for preparing a proteinaceous product as recited in claim 3 wherein the non-digestible solids are separated and removed from the heated aqueous suspension of partially hydrolyzed protein and oils by passing said suspension through an inclined vibrating screen which precludes passage therethrough of the non-digestible solids.

18. A method for preparing a proteinaceous product as recited in claim 3 wherein the non-digestible solids are separated and removed from the heated aqueous suspension of partially hydrolyzed protein and oils by passing said suspension through a centrifuge which precludes passage therethrough of the non-digestible solids.

19. A method for preparing a proteinaceous product as recited in claim 3 wherein the oil added to the heated aqueous suspension of partially hydrolyzed protein and oils is comprised of a portion of the oil removed from the oleaginous suspension of partially hydrolyzed protein.

20. A method for preparing a proteinaceous product as recited in claim 3 wherein the protein-oil suspension is pasteurized by passing said suspension through a first evaporator in which the protein-oil suspension is heated to a temperature within a range of about 200° to about 250° F. at a pressure within a range of about 0 to about 15 psig for a time period of about 10 to about 20 seconds.

21. A method for preparing a proteinaceous product as recited in claim 20 wherein the protein-oil suspension is passed through the first evaporator at a controlled flowrate so as to regulate the temperature, pressure, and time period of pasteurization of the protein-oil suspension.

22. A method for preparing a proteinaceous product as recited in claim 20 wherein the concentration of water in the protein-oil suspension is reduced by passing said suspension through the first evaporator and a second evaporator coupled to the first evaporator downstream of the first evaporator, in which second evaporator the protein-oil suspension is subjected to a subatmospheric pressure within a range of about 15 to about 25 inHg for a time period within a range of about 10 to about 20 seconds, and a temperature within a range of about 150° to about 160° F. just after the suspension enters said second evaporator and rising during passage of the suspension through the second evaporator to a temperature within a range of about 175° to about 200° F. just before the suspension exits said second evaporator.

23. A method for preparing a proteinaceous product as recited in claim 22 wherein the second evaporator is coupled to the first evaporator in a double effect configuration.

24. A method for preparing a proteinaceous product as recited in claim 3 wherein a portion of the oil is removed from the oleaginous suspension of partially hydrolyzed protein by passing said oleaginous suspension through a centrifuge.

25. The proteinaceous product prepared by the method recited in claim 1, comprising an oil content of about 20 to about 35 w/w percent, a partially hydrolyzed animal protein content of about 45 to about 65 w/w percent and an ash content of greater than $\theta$ up to about 7 w/w percent.

26. A method for preparing a particulate proteinaceous product comprising about 45 to 65 w/w percent partially hydrolyzed animal protein from raw protein-comprising animal parts, the method comprising the steps:
  reducing the raw animal parts to a ground condition;
  adding an enzyme composition comprising at least one type of proteolytic enzyme to the ground raw animal parts to form a predigestion mixture;
  preheating the predigestion mixture to a digestion temperature within a range suitable for proteolytic activity of the enzyme composition without denaturing the protein in the predigestion mixture;
  maintaining the predigestion mixture at said digestion temperature while the enzyme composition hydrolyzes the proteins in the predigestion mixture to a preselected degree of partial hydrolysis of the protein, to form an aqueous suspension of partially hydrolyzed animal parts;
  heating the aqueous suspension to a temperature greater than the digestion temperature so as to heat-deactivate the enzyme composition and convert fats therein to oils;
  separating and removing non-digestible solids from the heated aqueous suspension;
  adding oil to the heated aqueous suspension to form a protein-oil suspension;
  pasteurizing the protein-oil suspension;
  reducing the concentration of water in the protein-oil suspension to form an oleaginous suspension of partially hydrolyzed protein; and
  removing oil from the oleaginous suspension until the concentration of oil in the resulting proteinaceous product is within a range of about 20 to about 35 w/w percent and the concentration of partially hydrolyzed animal protein in said product is within a range of about 45 to about 65 w/w percent.

27. The particulate proteinaceous product prepared by the method recited in claim 26.

28. A particulate proteinaceous product as recited in claim 26 prepared from raw, protein-comprising animal parts selected from the group consisting of whole fish, fish parts, poultry by-products, ovine by-products, bovine by-products, and porcine by-products.

29. A particulate proteinaceous product as recited in claim 27 having a moisture content within a range of about 10 to about 15 w/w percent.

30. A particulate proteinaceous product as recited in claim 27 having an ash content within a range of greater than 0 up to about 7 w/w percent.

31. A particulate proteinaceous product as recited in claim 27 comprising partially hydrolyzed animal proteins having a number average molecular weight within a range of about 15,000 to about 30,000 daltons.

32. A method for preparing a proteinaceous product from raw protein-comprising animal parts, the method comprising the steps:
  (a) grinding the animal parts;
  (b) adding a protein-hydrolyzing composition comprising proteolytic enzymes to the ground animal parts to form a predigestion mixture;
  (c) passing the predigestion mixture through a heat exchanger to preheat the predigestion mixture to a digestion temperature within a range of about 140° to about 150° F. and to disperse the proteolytic enzymes throughout the ground animal parts;
  (d) while maintaining the predigestion mixture at the digestion temperature, passing the predigestion mixture sequentially through plural digesters in a plug-flow manner at a predetermined flowrate to achieve a predetermined degree of hydrolysis of the proteins in the predigestion mixture, thereby forming an aqueous suspension of partially hydrolyzed animal parts;
  (e) heating the aqueous suspension to an enzyme-deactivating temperature within a range of about 175° to about 185° F. to stop digestion of the proteins and to convert fats in the aqueous suspension to oils;
  (f) while maintaining the aqueous suspension at the enzyme-deactivating temperature, separating and removing non-digestible solids from the aqueous suspension by passing the aqueous suspension through an inclined vibrating screen capable of obstructing passage therethrough of non-digestible solids;
  (g) adding supplementary oil to the aqueous suspension to form a protein-oil suspension;
  (h) passing the protein-oil suspension through a first evaporator for pasteurization of the protein-oil suspension at a temperature within a range of about 200° to about 250° F., at a pressure of about 0 to about 15 psig, and for a predetermined time period within a range of about 10 to about 20 seconds;
  (i) removing a portion of the water from the pasteurized protein-oil suspension to form an oleaginous suspension by passing the pasteurized protein-oil suspension through a second evaporator at a subatmospheric pressure within a range of about 15 to about 25 inHg, at a transit time preselected within a range of about 10 to about 20 seconds so as to ensure that the oleaginous suspension exits the second evaporator at a temperature within a range of about 175° to about 200° F; and
  (j) removing sufficient oil from the oleaginous suspension to form a particulate proteinaceous product comprising oil at a concentration within a range of about 20 to about 35 w/w percent, moisture at a concentration within a range of about 10 to about 15 w/w percent, ash at a concentration within a range of about 0 to about 7 w/w percent, and non-denatured, partially hydrolyzed animal protein at a concentration within a range of about 45 to about 65 w/w percent.

33. A method for preparing a proteinaceous product as recited in claim 32 including the step of using at least a portion of the removed oil as the supplementary oil added in step (g).

* * * * *

UNITED STATES PATENT AND TRADEMARK OFFICE
CERTIFICATE OF CORRECTION

PATENT NO. : 5,053,234

DATED : October 1, 1991

INVENTOR(S) : ANDERSON ET AL.

It is certified that error appears in the above-identified patent and that said Letters Patent is hereby corrected as shown below:

On the title page, item [56] References Cited, on the first line of Related U.S. Application Data, "Aug. 13" should read --Aug. 23--; on the fifth line "No. 18,848" should read --No. 018,848--.

Column 14, line 54, "Tilapia" should read --Tilapia--;

Column 19, line 54, "Proixmate" should read --Proximate--;

Column 20, line 61, "aground" should read --a ground--;

Column 21, line 22, "claim including" should read --claim 1 including--;

Column 21, line 29, "within range" should read --within a range--.

Signed and Sealed this

Seventh Day of June, 1994

Attest:

BRUCE LEHMAN

Attesting Officer

Commissioner of Patents and Trademarks